United States Patent
Lindner

(10) Patent No.: US 9,276,688 B2
(45) Date of Patent: Mar. 1, 2016

(54) METHOD FOR THE CLOCK SYNCHRONIZATION OF A PLURALITY OF MODULES

(75) Inventor: Thomas Lindner, Munich (DE)

(73) Assignee: Unify GmbH & Co. KG, Munich (DE)

( * ) Notice: Subject to any disclaimer, the term of this patent is extended or adjusted under 35 U.S.C. 154(b) by 183 days.

(21) Appl. No.: 13/990,919

(22) PCT Filed: Jan. 28, 2011

(86) PCT No.: PCT/EP2011/000409
§ 371 (c)(1),
(2), (4) Date: May 31, 2013

(87) PCT Pub. No.: WO2012/095120
PCT Pub. Date: Jul. 19, 2012

(65) Prior Publication Data
US 2013/0250976 A1    Sep. 26, 2013

(30) Foreign Application Priority Data
Jan. 11, 2011    (EP) .................................... 11000151

(51) Int. Cl.
*H04J 3/06* (2006.01)
*H04J 3/16* (2006.01)
*H04L 7/08* (2006.01)

(52) U.S. Cl.
CPC ............. *H04J 3/0602* (2013.01); *H04J 3/0638* (2013.01); *H04J 3/1688* (2013.01); *H04L 7/08* (2013.01)

(58) Field of Classification Search
None
See application file for complete search history.

(56) References Cited

U.S. PATENT DOCUMENTS

| | | | |
|---|---|---|---|
| 7,103,124 B1 | 9/2006 | Lindskog et al. | |
| 2004/0005902 A1* | 1/2004 | Belcea | 455/502 |
| 2006/0280182 A1* | 12/2006 | Williams et al. | 370/394 |
| 2007/0030821 A1* | 2/2007 | Iwamura et al. | 370/328 |
| 2009/0147806 A1* | 6/2009 | Brueckheimer | 370/503 |
| 2009/0164655 A1* | 6/2009 | Pettersson et al. | 709/231 |
| 2009/0167383 A1* | 7/2009 | Bratschke et al. | 327/156 |
| 2011/0016343 A1* | 1/2011 | Hoch | 713/400 |
| 2012/0013937 A1* | 1/2012 | Ashmore et al. | 358/1.15 |
| 2012/0027067 A1* | 2/2012 | Cahill | 375/224 |

OTHER PUBLICATIONS

International Preliminary Report on Patentability for PCT/EP2011/000409 dated Jul. 16, 2013 (Forms PCT/IB/373, PCT/ISA/237) (English).

(Continued)

*Primary Examiner* — Alex Skripnikov
(74) *Attorney, Agent, or Firm* — Buchanan Ingersoll & Rooney PC

(57) ABSTRACT

The invention relates to a method or an arrangement for the clock synchronization of a plurality of distributed modules of an information or communication system, said modules being coupled via a packet-switched network. At least two of said modules are controlled by a local clock generator of the modules using an adjustable frequency, and a clock signal is transmitted via the network in the form of clock signal packets in a synchronous minter with respect to the local clock of the modules. One of said at least two modules takes over the function of a master module, and all remaining said at least two modules, the slave module(s), synchronize the local clock of the modules with the clock of the master module, wherein said slave modules ascertain a measurement for the deviation of the local clock generator of the modules relative to the clock generator of the master module by comparing the clock signal transmitted by the master module with the clock signal of the modules and use said measurement in order to regulate the local clock generator of the modules.

20 Claims, 3 Drawing Sheets

(56) References Cited

OTHER PUBLICATIONS

International Preliminary Report on Patentability for PCT/EP2011/000409 dated Jul. 16, 2013 (Forms PCT/IB/373, PCT/ISA/237) (German).

Written Opinion of the International Searching Authority for PCT/EP2011/000409 dated Nov. 16, 2011 (Form PCT/ISA/237) (German Translation).

International Search Report for PCT/EP2011/000409 dated Nov. 16, 2011 (Forms PCT/ISA/220, PCT/ISA/210) (German Translation).

\* cited by examiner

METHOD FOR THE CLOCK SYNCHRONIZATION OF A PLURALITY OF MODULES

CROSS REFERENCE TO RELATED APPLICATIONS

This application is the U.S. national phase under 35 U.S.C. §371 of PCT International Application No. PCT/EP2011/000409, filed Jan. 28, 2011, and claiming priority to European Application No. 11000151.8, filed on Jan. 11, 2011.

BACKGROUND OF THE INVENTION

1. Field of the Invention

Embodiments relate to a clock synchronization of a plurality of distributed modules in an information or communications system, said modules being coupled via a packet-switched network.

2. Background of the Related Art

Information or communications technology, and in particular in the realization of analog or digital telecommunications interface gateways, a plurality of distributed modules coupled via a packet-switched network, in particular software-driven peripheral modules which are linked, for example, over a standard LAN, are to be clock-synchronized. In known solutions, all peripheral modules of a module frame are connected via special clock signals using special hardware with a central clock generator. Known software-based solutions, on the other hand, either forgo synchronization entirely or are based on the standardized PTP protocol according to IEEE 1588, which also requires special hardware components to issue high-precision timestamps.

BRIEF SUMMARY OF THE INVENTION

We provide a method for the clock synchronization of a plurality of distributed modules in an information or communications system, said modules being coupled via a packet-switched network, or a corresponding arrangement is provided, where at least two of said modules are controlled by a local clock generator of the modules, using an adjustable frequency, and transmit a clock signal over the network in the form of clock signal packets that are synchronous to their local clocks. One of said at least two modules assumes the function of a master module for the clock, to which all remaining of these at least two modules, the slave module(s), synchronize their local clocks by determining a measurement for the deviation of their local clock generators relative to the clock generator of the master module, by comparing the clock signal transmitted by the master module to their own clock signals, and use said measurement to control their local clock generators, preferably while decreasing or minimizing said measurement for the deviation of their local clock generators relative to the clock generator of the master module.

DETAILED DESCRIPTION OF THE INVENTION

Figure 1:
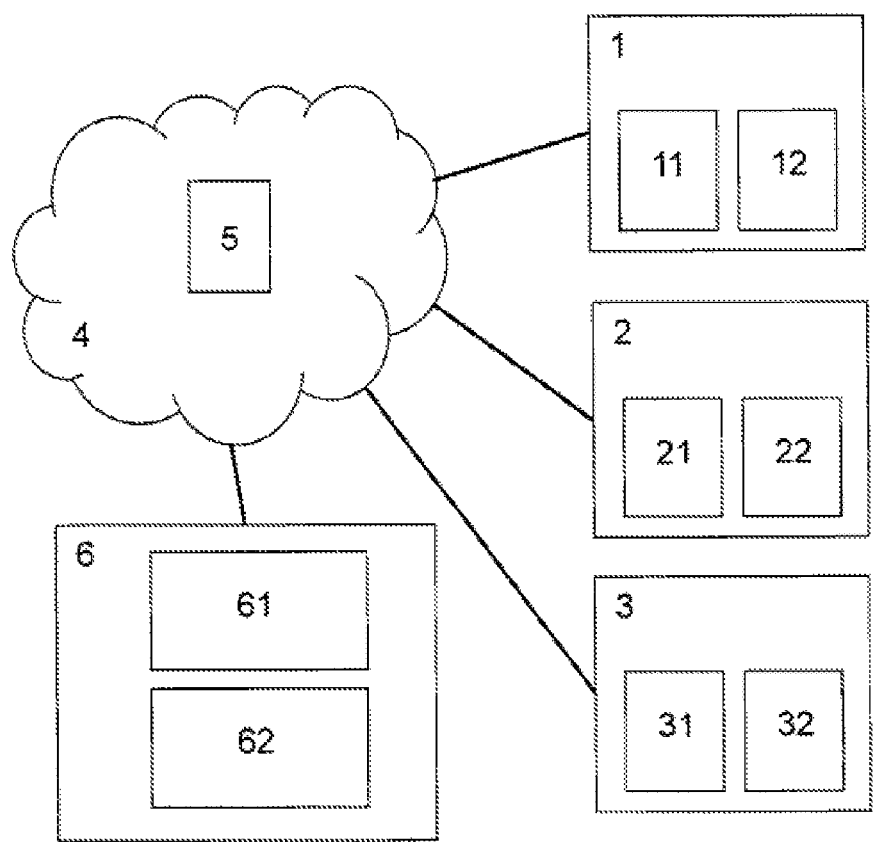
FIG. 1 schematically shows a preferred embodiment of an arrangement according to the invention.
Figure 2:
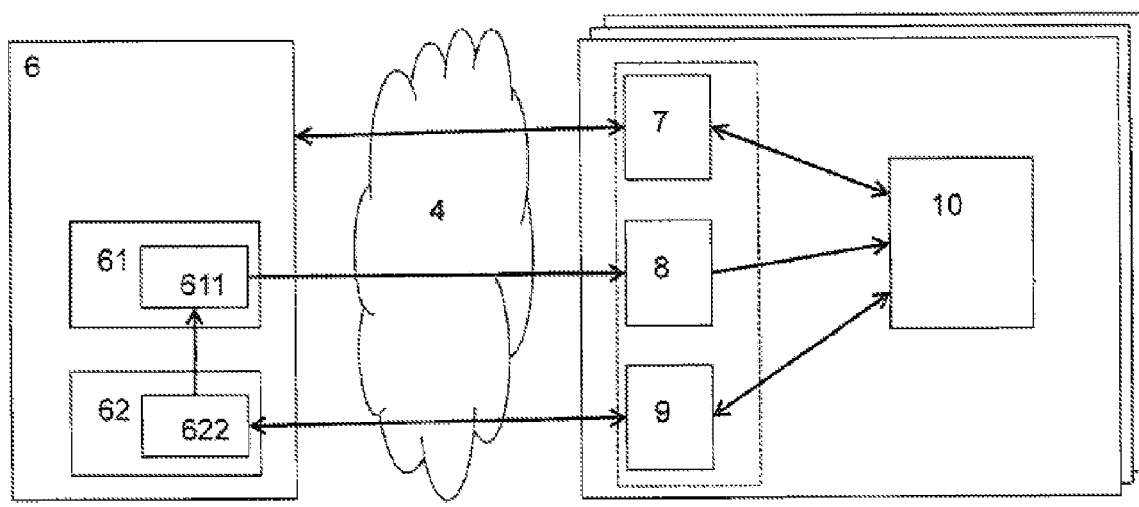
FIG. 2 schematically shows signaling according to a preferred embodiment of the invention.

In this context, a module in an information or communications system refers to a structurally defined functional unit in an information or communications system, in particular a peripheral module for realizing analog or digital telecommunications interfaces. In this context, an information or communications system refers to any system that can be used to implement information or communications services. Prime examples for such systems are telecommunications systems, in particular telephone systems.

These telecommunications systems preferably use the Pulse Code Modulation (PCM) method to convert analog signals, for example voice or video signals, into digital signals.

Using the PCM method, a continuous digital data stream is generated that represents the analog signal. For this purpose, the time- and value-continuous analog signal is converted to a time- and value-discrete digital signal.

The Time-Division Multiplexing (TDM) method is used preferably for the transmission on the digital side. With this method, the serial data streams of several communications channels are combined using a multiplexing method. This is done preferably by using a frame structure. For example, 32 channels within a serial data stream are transferred in sequential succession in 32 time slots. These 32 time slots form one PCM frame. A typical example would be 32 channels at an 8-bit resolution and a sampling rate of 8000 Hz, resulting in a bitrate of 64 kbit/s and an aggregate bitrate of 32×64 kbit/s=2.048 Mbit/s. The PCM frame repeats every 125 µs, corresponding to a PCM frame clock of 8 kHz. The PCM transmission clock preferably corresponds to the aggregate clock rate, i.e., 2.048 MHz in this example. These clock rates are synchronous to each other; for example, it would also be possible to generate the transmission clock rate from the frame clock rate. The task of providing the PCM clock rates is preferably assumed by a clock generator.

Trouble-free transmission of such PCM/TDM signals, e.g., from one spatially demarcated functional unit to another, requires synchronicity of the PCM clock signals. The lack of such synchronicity is referred to as bit slip. If the PCM clock rate of a functional unit A is greater than that of another functional unit B, then some bits will be discarded during the transmission from A to B, which leads to skipping of some samples. In the opposite direction, fewer samples arrive at A than are needed there; typically one tries to conceal the missing values through interpolation. Such errors can become noticeable in speech signals typically as clicking sounds; in fax transmissions they can lead to terminations and during data transmissions to a reduction in data throughput.

In this context, a clock generator refers to a functional unit that is set up to generate a clock signal. A local clock generator of a module refers to a clock generator that is functionally assigned to that module, i.e., that generates the clock signal for that module. Such a local clock generator is preferably operated at a frequency that is adjustable by a software program. A clock generator, clock signal generator or clock pulse generator refers to a component that generates a clock signal, i.e., preferably transmits pulses at a certain frequency. These may be mechanical, electrical but also electronic components or modules that are required, among other things, for data processing and synchronization. A clock pulse generator is often used in a calculator aided by a control unit. In an electronic calculator, a clock pulse generator preferably clocks the calculation steps.

Many times, a clock pulse generator is a flip-flop circuit or an oscillator. The use of digitally controlled oscillators is preferred for this purpose. A digitally controlled oscillator (DCO) or also numerically controlled oscillator is an electronic circuit or an electronic component, which generates an oscillation preferably based on the method of direct digital synthesis (DDS), said oscillation having a frequency that is preferably set directly using a numeric value, which is preferably determined by a program. This results in a very precisely set frequency that remains constant (in the context of the specifications of the component or the components of the circuit). In this context, a packet-switched network refers to a network that transmits information via so-called packets. Examples of such packet-switched networks are computer networks, in particular local area networks (LANs) but also wide area networks and the Internet.

In this context, a master module refers to a module with a clock rate to which all other modules, the so-called slave modules, synchronize their local clock rates. To accomplish this, the slave modules preferably determine a measurement for the deviation of their local clock generators relative to the clock generator of the master module by comparing a clock signal transmitted by the master module to their own clock signals and use said measurement to control their local clock generators.

According to one preferred embodiment of the invention, whose features can also be combined with features of other embodiments of the invention, a method or arrangement is provided wherein each individual module of these at least two modules transmits its clock signal packet during a time window that is different from the time window of any other of these at least two modules. In this way, it is possible to position the clock signal packets in time such that otherwise inevitable stochastic delays, in particular delays due to the finite processing speed of network components such as switches or routers, do not even occur. This eliminates the need to apply complex methods such as the ones specified in the IEEE 1588, for example.

This means in particular that standard hardware and software components in the network interfaces can be used to set up networks equipped according to the invention, which results in significant cost advantages. The accuracy achieved when using the method according to the invention is in a range of 2-5 µs, which is far below the length of a PCM frame with a typical length of 125 µs. Bit slip can thus be largely prevented.

According to another preferred embodiment of the invention, whose features can also be combined with features of other embodiments, a local control unit is assigned to each module and is connected to a central control computer via the network.

According to another preferred embodiment of the invention, whose features can also be combined with features of other embodiments, each local control unit has a quartz oscillator with an adjustable frequency, said quartz oscillator being preferably controlled by a program via a digital-to-analog converter.

A quartz oscillator is an electronic circuit for generating oscillations that uses an oscillating quartz as the frequency-determining component. In a narrower sense, a quartz oscillator is a fully assembled oscillator circuit that is installed in a housing together with the frequency-determining quartz and is available as a standard component. Quartz oscillators are very accurate in their frequency (number of oscillations per time unit) and typically have deviations of less than 100 ppm. Other simple oscillator circuits, e.g., those with LC oscillator circuits, are significantly less accurate, having deviations from the nominal frequency of over 1% (10,000 ppm). In practical applications, the quartz oscillator is often found as a clock pulse generator for processors, micro-controllers, radio units and watches. However, quartz oscillators are increasingly being replaced by more cost-efficient ceramic resonators.

The oscillating quartzes used in quartz oscillator circuits are primarily crystal wafers, rods, or forks (like a tuning fork) that can change their mechanical shape by applying a voltage, whereby the change in shape in turn generates an electrical voltage. The reaction is determined by the mechanical oscillation modes of the piezoelectric element (oscillating quartz or also a ceramic oscillator).

With an alternating current of a certain frequency, an oscillating quartz is excited to have particularly strong resonance oscillations (piezoelectric sound transducers also have this property). This frequency is referred to as resonance frequency. With a suitable crystal cut, the frequency is nearly independent of environmental influences such as temperature or amplitude and can therefore be used as a precise clock pulse generator (long-term stability better than 0.0001%). Oscillating quartz wafers can be operated in the following electrical/mechanical modes:

With series resonance, their apparent resistance to AC is particularly small and they behave like a serial connection of an inductor and a capacitor.

With parallel resonance, their apparent resistance is particularly high. In this case they behave like a parallel connection of a capacitor and an inductor, with the particularity that no direct current can be conducted (quartz is a very good insulator). This parallel resonance is about 0.1% higher than the serial resonance and can be changed using a small capacitor connected in parallel (so-called quartz crystal pulling).

Preferred types of oscillators in connection with the present invention are oscillators whose frequency can be controlled ("pulled") via the voltage (VCXO—Voltage-Controlled Crystal Oscillator). Usually the frequency can be changed by only about 100 ppm. Typical applications of VCXOs are controllable oscillators in phase-locked loops.

A frequency-variable oscillator or quartz oscillator with an adjustable frequency, VXO for short, is a quartz oscillator whose frequency can be changed. If the quartz oscillator can be adjusted via the electrical voltage, it is referred to as a VCXO (voltage-controlled crystal oscillator). The control voltage is preferably created via a digital-to-analog converter.

A digital-to-analog converter (DAC) is used to convert quantized digital signals or individual values into analog signals. Signal sources are the analog-to-digital converter and/or digital information or calculations. As a rule, the DAC is designed as an integrated circuit (IC).

According to another preferred embodiment of the invention, whose features can also be combined with features of other embodiments, the clock signal comprises at least one pulse code modulation signal, typically the PCM frame clock, which is transmitted over the network, preferably according to the real time transport protocol synchronous to the clock rate of the pulse code modulation signal.

The Real-Time Transport Protocol (RTP) is a protocol for continuous transmission of audiovisual data (streams) over IP-based networks. The protocol was first standardized in RFC 1889 in 1996. An updated RFC was published in 2003. RFC 3550 replaced RFC 1889 at that time. It is used to transport multimedia data streams (audio, video, text, etc.) over networks, i.e., encoding, packetizing, and sending the data. RTP is a packet-based protocol and is normally operated using UDP.

RTP can be used for either Unicast connections or Multicast communication on the Internet. The Real Time Control Protocol cooperates with RTP and is used to negotiate and maintain Quality-of-Service parameters (QoS). RTP is used in many areas, including use in IP telephone technologies H.323 and SIP to transmit audio/video streams of the conversation. The primary function of RTP is to transmit real-timesensitive data streams, while the Real-Time Streaming Protocol (RTSP) is used to control and check the data transmission. The Datagram Congestion Control Protocol (DCCP) is a current approach to enable congestion control also for media streams based on RTP/UDP. According to another preferred embodiment of the invention, whose features can also be combined with features of other embodiments, the frequency difference and the phase difference between the packet stream sent by the slave module and the packet stream of the master module for each slave module are determined.

According to another preferred embodiment of the invention, whose features can also be combined with features of other embodiments, clock signals are transported in the network with a higher priority compared to other packets, in particular compared to other signaling packets.

The invention is described below in more detail, based on preferred exemplary embodiments and with reference to the figures.

In the embodiments of the invention shown in the figures, each peripheral module 10, 12, 22, 32 is connected to a control computer (SR) 6 via a local control unit (SE) 11, 21, 31 and via a LAN switch (LS) 5. Preferably, each peripheral module and local control unit together form a module 1, 2, 3 that realizes, for example, bundles of dedicated telecommunications interfaces.

The software used for central control of the modules can be divided roughly into two complexes: A first complex is used for signaling; a second complex is used for media processing. Signaling is preferably part of a gateway application (GA) 61; media processing occurs preferably in a media server (MS) 62 controlled by the gateway application.

Each control unit 11, 21, 31 preferably has a voltage-controlled crystal oscillator (VCXO) 8 for varying the frequency, which is preferably controlled via software and a digital-to-analog converter. Clock synchronization is realized through a master-slave method, wherein all modules, except for the module declared to be the clock master, control their local clock signals in relation to the master clock.

The individual PCM channels are sent bundled over the network 4, preferably a Local Area Network (LAN), preferably in the form of RTP packets 9. The transmission rate is preferably a pre-defined value, which preferably depends on the number of channels as well as the selected packet size. For example, a rate of 400 packets per second was selected for the tested prototypes. Transmission of these packets preferably occurs synchronous to the PCM clock.

The software algorithms for controlling the slave modules are located in part on the central media server 62 and in part in the gateway application 61. Preferably the frequency difference and/or the phase difference between each slave module's packet stream and the packet stream of the master module are determined 622. The control information 611 for correcting the VCXO clock oscillators for a slave module can be determined from this difference as the actual value.

Occasional wrong values can occur when measuring the frequency and phase difference, due to highly sporadic delays in the operating system of the control computer 6. Using an adaptive plausibility check, they can be detected and discarded. For example, at steady state, potential changes in the phase difference are restricted to the temperature drift of the VCXO 8. The maximum occurring difference can be estimated, and all measurements that simulate a higher difference can easily be excluded.

Figure 3:
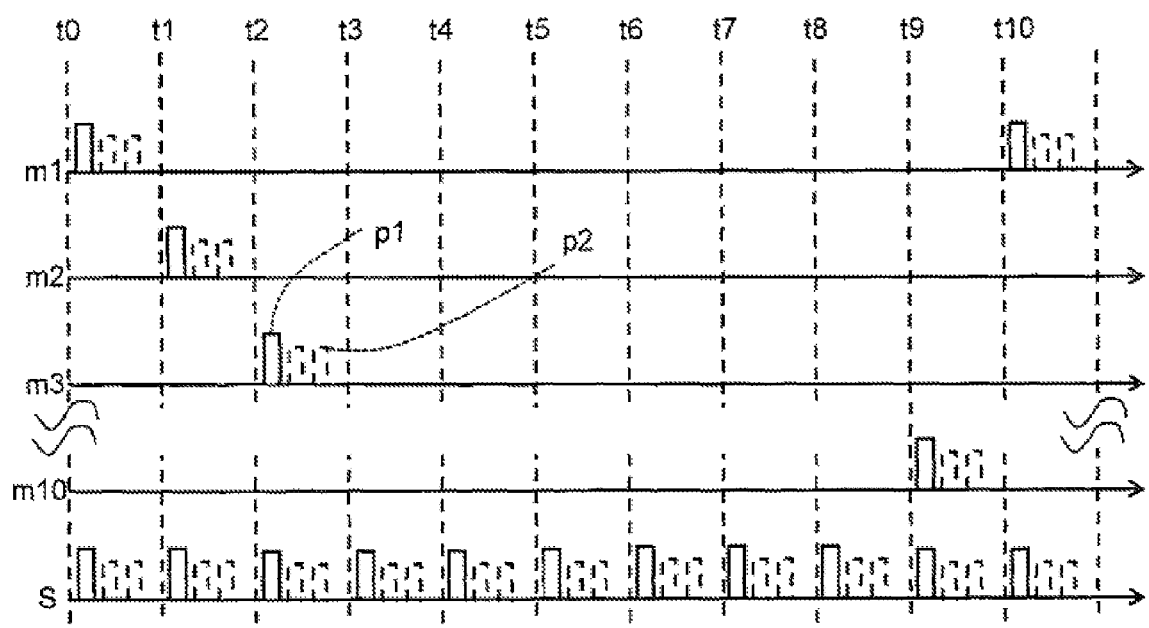
FIG. 3 schematically shows the packet stream according to a preferred embodiment of the invention.

Usually, the transmitted packets are stochastically delayed in the LAN switch 5. With randomly occurring packet clusters of N packets (so-called "bursts") and utilization of a maximum packet size of 1518 bytes, delays of N times 121 µs can occur for a transmission rate of 100 Mbit/s, for example, and delays of N times 12 µs for a Gigabit Ethernet. These delays interfere with clock synchronization. For this reason, phase control is modified preferably such that each peripheral module m1, m2, m3, . . . , m10 transmits its RTP packet p1 during a certain time window t0, t1, t2, . . . , t10. Packet clusters (bursts) and the resulting delays in the LAN switch 5 are thus prevented from the outset. Other LAN packets p2, for example UDP packets that are used for signaling 7 or for control are transmitted with lower priority, directly following the RTP packets, such that a sufficient distance remains to the next RTP packet. The bottom axis of FIG. 3 schematically shows the multiplexed packet stream after the LAN switch 5 to the media server 62.

A main concept of the invention is to position the packets presented to the LAN switch 5 at times such that otherwise inevitable stochastic delays cannot even occur. This eliminates the need to apply complex methods, as are specified in the IEEE 1588 for example. The advantageous result is that standardized hardware and software components can be used for the LAN interfaces, which translates to significant cost advantages.

The invention claimed is:

1. A method for clock synchronization of a plurality of distributed modules in an information system or a communications system, said modules being coupled via a packet-switched network, comprising:

controlling a plurality of modules comprising a first module, a second module, and a third module, each of the modules having a local clock generator, each of the modules being configured to transmit a clock signal of the local clock generator of that module over the network as at least one clock signal packet synchronous to a local clock rate of the local clock generator, the controlling of each of the modules comprising:

causing the first module to assume a master module role for synchronization of clock rates for the modules;

sending, by the first module, at least one first clock signal via the network;

transmitting, by the second module, at least one second clock signal during a first time window via the network;

transmitting, by the third module, at least one third clock signal during a second time window via the network, the second time window being different from the first time window such that the at least one third clock signal of the third module is not transmitted during the first time window;

determining a first measurement for a deviation of the local clock generator of the second module relative to the local clock generator of the first module by comparing the at least one first clock signal transmitted by the first module to the at least one second clock signal transmitted by the second module and using the first measurement to control the local clock generator of the second module;

determining a second measurement for a deviation of the local clock generator of the third module relative to the local clock generator of the first module by comparing the at least one first clock signal transmitted by the first module to the at least one third clock signal transmitted by the third module and using the second measurement to control the local clock generator of the third module.

2. The method of claim 1, comprising assigning a local control unit to each module and connecting each local control unit to a central control computer via the network.

3. The method of claim 2, where each local control unit has a quartz oscillator with an adjustable frequency, said quartz oscillator controlled by a program via a digital-to-analog converter.

4. The method of claim 1, wherein each of the at least one first clock signal, at least one second clock signal, and at least one third clock signal comprises at least one pulse code modulation signal, and wherein the pulse code modulation signal is transmitted over the network in data packets formed in accordance with real time transport protocol.

5. The method of claim 1, comprising determining a frequency difference and a phase difference between a packet stream transmitted from a slave module and a packet stream of the master module for each slave module.

6. The method of claim 1, comprising setting priority for clock signal packets in the network so that the clock signal packets have a higher priority as compared to other signaling packets.

7. The method of claim 1, wherein the determining of the first measurement comprises:
determining a frequency difference and a phase difference between the at least one second clock signal and the at least one first clock signal.

8. The method of claim 1, comprising:
a switch device receiving the at least one first clock signal, the at least one second clock signal, and the at least one third clock signal at different times such that stochastic delays associated with transmission of clock signals is avoided.

9. The method of claim 1, wherein the at least one first clock signal, the at least one second clock signal, and the at least one third clock signal are each transmitted to a control computer, and wherein the control computer performs the determining of the first measurement and performs the determining of the second measurement.

10. The method of claim 9, comprising:
receiving, by a switch device of the network, the at least one first clock signal, the at least one second clock signal, and the at least one third clock signal at different times such that stochastic delays associated with transmission of clock signals is avoided; and
forwarding, by the switch device, the at least one first clock signal, the at least one second clock signal, and the at least one third clock signal to the control computer.

11. The method of claim 1, wherein the at least one first clock signal is sent via the network during a third time window, the third time window being different than the second time window and the third time window being different than the first time window such that the at least one first clock signal is not transmitted during the first time window and is not transmitted during the second time window.

12. An apparatus comprising:
a plurality of modules in an information system or a communications system, the modules being connected via a packet-switched network, the modules comprising a first module, a second module, and a third module, each of the modules having a local clock generator, each of the modules being configured to transmit a clock signal of the local clock generator of that module over the network as at least one clock signal packet synchronous to a local clock rate of the local clock generator;
a control computer connected to the modules via the network;
the first module configured to send at least one first clock signal to the control computer via the network;
the second module configured to send at least one second clock signal to the control computer during a first time window via the network;
the third module configured to send at least one third clock signal to the control computer during a second time window via the network, the second time window being different from the first time window such that the at least one third clock signal of the third module is not transmitted during the first time window;
the control computer configured to determine:
a first measurement for a deviation of the local clock generator of the second module relative to the local clock generator of the first module by comparing the at least one first clock signal transmitted by the first module to the at least one second clock signal transmitted by the second module and using the first measurement to control the local clock generator of the second module, and
a second measurement for a deviation of the local clock generator of the third module relative to the local clock generator of the first module by comparing the at least one first clock signal transmitted by the first module to the at least one third clock signal transmitted by the third module and using the second measurement to control the local clock generator of the third module.

13. The apparatus of claim 12, wherein a local control unit is assigned to each module and is connected to the control computer via the network.

14. The apparatus of claim 13, wherein each local control unit has a quartz oscillator with an adjustable frequency, said quartz oscillator being controlled by a program via a digital-to-analog converter.

15. The apparatus of claim 12, wherein each clock signal comprises at least one pulse code modulation signal, which is transmitted across the network via data packets formed in accordance with real time transport protocol, synchronous to a clock rate of a pulse code modulation signal.

16. The apparatus of claim 12, wherein a frequency difference and a phase difference between the at least one second clock signal and the at least one first clock signal are determined by the control computer.

17. The apparatus of claim 12, comprising:
a switch device connected between the control computer and the modules, the switch device configured to receive the at least one first clock signal, at least one second clock signal and at least one third clock signal at different times and also configured to forward the at least one first clock signal, at least one second clock signal, and at least one third clock signal to the control computer at different times.

18. The apparatus of claim 17, wherein the control computer is a central control computer.

19. The apparatus of claim 17, wherein the at least one first clock signal is transmitted as at least one clock signal data packet, the at least one second clock signal is transmitted as at least one clock signal data packet, and the at least one third clock signal is transmitted as at least one clock signal data packet.

20. The apparatus of claim 12, wherein the at least one first clock signal is sent via the network during a third time window, the third time window being different than the second time window and the third time window being different than the first time window such that the at least one first clock signal is not transmitted during the first time window and is not transmitted during the second time window.

\* \* \* \* \*